United States Patent [19]

Migliorini et al.

[11] Patent Number: 5,591,520

[45] Date of Patent: Jan. 7, 1997

[54] HIGH BARRIER FILM

[75] Inventors: Robert A. Migliorini; Eldridge M. Mount, III, both of Fairport, N.Y.

[73] Assignee: Mobil Oil Corporation, Fairfax, Va.

[21] Appl. No.: 430,701

[22] Filed: Apr. 28, 1995

Related U.S. Application Data

[63] Continuation of Ser. No. 78,498, Jun. 21, 1993, abandoned, which is a continuation of Ser. No. 805,177, Dec. 11, 1991, abandoned.

[51] Int. Cl.$^6$ .................... B32B 15/08; B32B 27/32; B32B 27/34

[52] U.S. Cl. .................... 428/347; 428/349; 428/458; 428/461; 428/463; 428/476.1; 428/476.3; 428/476.9; 428/516; 428/520; 428/910

[58] Field of Search .................... 428/346, 347, 428/349, 458, 461, 463, 476.1, 476.3, 476.9, 516, 520, 124, 35.3, 35.8, 35.9, 910

[56] References Cited

U.S. PATENT DOCUMENTS

| | | | |
|---|---|---|---|
| 4,085,244 | 4/1978 | Stillman | 428/192 |
| 4,309,466 | 1/1982 | Stillman | 428/35.3 |
| 4,361,628 | 11/1982 | Krueger et al. | 428/475.8 |
| 4,588,643 | 5/1986 | Krueger et al. | 428/475.8 |
| 4,668,571 | 5/1987 | Moriarty, Jr. | 428/327 |
| 4,671,986 | 6/1987 | Clementini et al. | 428/216 |
| 4,908,272 | 3/1990 | Harada et al. | 428/412 |
| 4,990,562 | 2/1991 | Chou et al. | 525/58 |
| 5,053,259 | 10/1991 | Vicik | 428/36.91 |

FOREIGN PATENT DOCUMENTS 0096581  12/1983  European Pat. Off. .

*Primary Examiner*—D. S. Nakarani
*Attorney, Agent, or Firm*—Ronald A. Bleeker; Laurence P. Hobbes; Dennis P. Santini

[57] ABSTRACT

An oriented film combination of (a) a base layer of polypropylene at least one surface of which comprises a maleic acid anhydride modified polypropylene; and (b) on at least one surface, a skin layer of an amorphous polyamide or a blend of an amorphous polyamide and a semicrystalline polyamide.

6 Claims, No Drawings

HIGH BARRIER FILM

This is a continuation of application Ser. No. 08/078,498, filed on Jun. 21, 1993 now abandoned, which is a continuation of U.S. patent application Ser. No. 07/805,177, filed Dec. 11, 1991, now abandoned.

BACKGROUND OF THE INVENTION

This invention relates to a multi-layer film structure that may have a metallized surface. The bonding of metals, such as, aluminum, silver, chromium, etc., to plastic films and the gas barrier developed, has allowed such films to replace metallic foils in many instances. The flexibility of the films necessitates the formation of a strong metal/plastic bond and a number of approaches have been developed for providing such bonding. In some cases a special primer layer must be applied to the base layer in order to achieve an effective bond between the metal and the substrate. In many cases a thermoplastic surface must be corona discharged treated in order for there to be an effective bond between the metal and the thermoplastic surface. Gas barrier properties will also depend upon the condition of the surface on which the metal is deposited.

It is an object of the present invention to present a metallized film having a far greater metal adhesion level than that obtainable by corona discharge treating or priming of a substrate layer. It is a further object of the invention to provide a metallized film which exhibits excellent bonds strengths in both adhesive and extrusion lamination and significantly improved oxygen gas barrier.

SUMMARY OF THE INVENTION

In accordance with the present invention an oriented multi-layer film combination comprises:

(a) a base layer of polypropylene homopolymer or copolymer, at least one surface thereof comprising a maleic acid anhydride modified polypropylene homopolymer or copolymer; and (b) On said at least one surface a skin layer of a member selected from the group consisting of (1) an amorphous polyamide and (2) a blend of an amorphous polyamide and a crystalline polyamide. This film combination presents a polyamide surface to which can be strongly bonded a metallized layer.

DETAILED DESCRIPTION OF THE INVENTION

The substrates contemplated herein include the homopolymers and copolymers of polypropylene, particularly preferred are isotactic polypropylenes containing at least 80% by weight of isotactic polypropylene. This material has a density ranging from about 0.90 to 0.91, a crystalline melting point of about 160°–165° C., and a melt index of about 2–6, preferably 3–4, grams/10 minutes. This material is about 80–100% isotactic, and preferably 95–96% isotactic. Commercially available materials of this description are Exxon 4252 and ARCO W472.

While the polyamide of the present invention can be applied directly to the surface of the polypropylene or the polypropylene copolymer, it is preferred that the surface be modified by a particular functionalized material. This can be mixed into or applied on top of the polypropylene substrate, then the polyamide will aggressively adhere to this so-modified material. If a maleic anhydride modified polypropylene homopolymer or copolymer becomes a part of the substrate surface either by being interblended therewith or by being extruded thereon as a surface skin layer, this then becomes an ideal surface for receiving the polyamide layer of the present invention. This modified surface layer or skin layer itself cannot be separated from the propylene homopolymer or copolymer substrate. By a "maleic anhydride modified polypropylene homopolymer or copolymer" is meant the product resulting from the reaction between maleic anhydride and the thermal degradation product of polypropylene or polypropylene copolymer. Examples of this material can be found disclosed in U.S. Pat. No. 3,480,580 issued Nov. 25, 1969, the disclosure of which is incorporated herein by reference in its entirety. Particular attention is directed to examples 3, 4 and 6 of the specification.

The maleic anhydride modified polypropylene or a copolymer thereof can be prepared by a fairly simple process. For example, about 125 grams of low viscosity polypropylene of 3300 centipoise at 190° C. and 7.5 grams of maleic anhydride are placed in a 500 ml glass round-bottom flask. This flask has three necks and is fitted with a metal sweeper, a dropping funnel and a steam-jacketed condenser to return maleic anhydride which boils out of the reaction mixture. The flask is lowered into a Wood's metal bath at a temperature of about 200° C. After about 1 hour the product is poured from the flask onto a metal tray. The waxy product will have a melt viscosity of 3600 centipoise at 190° C. and a saponification number of 16.

Low viscosity polymers can also be produced in the above manner from low molecular weight 98–96/2–4 propylene/ethylene copolymers, 50/50 propylene/butene-1 copolymer, 95/5 propylene/pentene-1 copolymer, 90/10 propylene/hexene-1 copolymer, 80/20 propylene/4-methyl-1-pentene copolymer, 75/25 propylene, dodecene-1 copolymer and 90/10 butene-1/hexene copolymer. In general, propylene copolymerized with another alpha olefin, including ethylene.

The procedure for the use of a maleic anhydride modified polypropylene homopolymer or copolymer, when this material is interblended into the base layer is exemplified by the following technique. A maleic anhydride modified polypropylene, e.g., Epolene E-43, a maleic anhydride modified polypropylene obtained from Eastman Kodak Company, melt-blended with a polypropylene homopolymer, such as, Exxon 4252 (85 parts) to give a 15% master batch. 20 parts of the master batch is dry blended with 80 parts of the polypropylene copolymer to give a resin blend containing 3% of the maleic anhydride modified polypropylene. This blend will contain sufficient maleic anhydride-modified polypropylene at the surface of the substrate to aggressively bond the polyamide thereto. The alternative method of making available the maleic anhydride-modified polypropylene homopolymer or copolymer at the surface of the substrate is to coextrude the base polymer with a skin layer containing the maleic anhydride-modified polymer.

The contemplated polyamides broadly include the amorphous polyamides and the semicrystalline polyamides. The amorphous polyamides are described as those polyamides which are lacking in crystallinity as shown by the lack of endotherm crystalline melting peak in a Differential Scanning Calorimeter measurement (ASTM D 3417), 10° C./minute. Examples of the amorphous polyamides that can be used include those amorphous polymers prepared from the following diamines: hexamethylenediamine, 2-methylpentamethylenediamine, 2,2,4-trimethylhexamethylenediamine, 2,4,4-trimethylhexamethylenediamine, bis(4-aminocyclohexyl)methane, 2,2-bis(4-aminocyclohexyl)isopropylidene, 1,4-diaminocyclohexane, 1,3-diaminocyclohexane, meta-xylylenediamine, 1,5-diaminopentane, 1,4-diaminobutane, 1,3-diaminopropane, 2-ethyldiaminobutane, 1,4-diaminomethylcyclohexane, p-xylylenediamine, m-phenylenediamine, p-phenylenediamine, and alkyl substituted m-phenylenediamine and p-phenylenediamine.

Examples of polyamides that can be used include those amorphous polymers prepared from the following dicarboxylic acids: isophthalic acid, terephthalic acid, alkyl substituted iso- and terephthalic acid, adipic acid, sebacic acid, butane dicarboxylic acid, and the like.

Specific examples of amorphous polyamides which are suitable for this invention include: hexamethylenediamine isophthalamide, hexamethylenediamine isophthalamide/terephthalamide terpolymer, having iso/terephthalic moiety ratios of 100/0 to 60/40, mixtures of 2,2,4- and 2,4,4-trimethylhexamethylenediamine terephthalamide, copolymers of hexamethylene diamine and 2-methylpentamethylenediamine with iso- or terephthalic acids, or mixtures of these acids. Polyamides based on hexamethylenediamine iso/terephthalamide containing high levels of terephthalic acid moiety may also be useful provided a second diamine such as 2-methyldiaminopentane is incorporated to produce a processible amorphous polymer.

The above amorphous polyamides may contain as comonomers minor amounts of lactam species such as caprolactam or lauryllactam, even though polymers based on these monomers alone are not amorphous. The important feature is that the polyamide as a whole must be amorphous. Thus small amounts of these comonomers may be incorporated as long as they do not impart crystallinity to the polyamide. In addition, up to about 10 weight % of a liquid or solid plasticizer such as glycerol, sorbitol, or toluenesulfonamide ("Santicizer 8" from Monsanto) may be included with the amorphous polyamide.

For most applications the Tg is likewise not clearly demarked. But amorphous polyamides with Tg above about 160° C. are not readily thermoformable when used as a barrier layer. Thus all-aromatic polyamides, having aromatic groups in both acid and amine moieties, tend to have a Tg which is too high to permit thermoforming, and are thus normally unsuitable for the purposes of this invention.

As indicated above, the amorphous polyamide of the present invention can be blended with at least one semicrystalline polyamide.

This term refers to the traditional semicrystalline nylons which are generally prepared from lactams or amino acids, such as nylon 6 or nylon 11, or from condensation of diamines such as hexamethylene diamine with dibasic acids, such as succinic, adipic, or sebacic acids. Copolymers and terpolymers of these polyamides are also included, such as copolymers of hexamethylenediamine/adipic acid with caprolactam (nylon 6,66). Blends of two or more crystalline polyamides can also be used. The polyamide of the present invention, both semicrystalline and amorphous, are prepared by condensation polymerization which is well known to those skilled in the art.

As indicated above the polyamide skin comprises the surface for receipt of a vacuum metallization. A further advantage of employing such a polyamide is that it is not necessary to corona discharge treat the polyamide surface layer prior to metallization because it inherently has a wetting tension of 42 dynes/cm. Higher wetting tensions are, however, obtainable by employing corona or flame treatment processes. The inherent polar nature of the polyamide skin results in metal adhesion levels far exceeding those obtainable with a treated polypropylene homopolymer skin.

The metallized OPP film also exhibits excellent bond strength in both adhesive and extrusion lamination. Further desirable properties of the polyamide/polypropylene base film for metallization, are that it displays an excellent oxygen gas barrier when metallized as well as optical clarity and metal uniformity. It also retains the other desirable properties of metallized oriented polypropylene film, such as, good water vapor barrier.

It is to be understood that opposite the polyamide surface, the multi-layer film of the present invention can have a heat-seal layer applied thereto. Preferred heat-seal layers include an ethylene-propylene random copolymer, and an ethylene-propylene-butene-1 terpolymer, etc.

EXAMPLE

A three layer sheet was produced by coextrusion, employing the following materials:

A-layer dupont amorphous polyamide obtained from the condensation reaction of hexamethylenediamine and isophthalic anhydride;

B-layer 50% polypropylene homopolymer-50% Mitsui QF500 (maleic anhydride modified polypropylene); and C-layer ethylene-propylene-butene-1 terpolymer containing 700 ppm erucamide antiblock.

The coextrudate was quenched at 150° F. on a cast roll, reheated on rolls to 270° F. and stretched 3.5 times its original length in the machine direction. The sheet was subsequently stretched eight times its original width in a tenter apparatus at 310°–330° F. and corona treated on the polyamide side before being wound on a roll. Line speed was 50 fpm. The overall film thickness was 80 gauge. The amorphous polyamide layer was approximately 10 gauge units and the terpolymer layer was approximately 4 gauge units. The off-line wetting tension of the polyamide side of the film was >50 dynes/cm. The film was vacuum metallized with aluminum on the polyamide skin to an optical density 2.5 employing conventional vacuum metallization techniques. The water vapor transmission rate of the resulting metallized film was 0.02 g/100 in$^2$/24 hr at 100° F., 90% relative humidity. The oxygen transmission rate of the metallized film was 1.0 cc/100 in$^2$/24 hr.

The metallized film was subsequently extrusion laminated to a low density polyethylene film. The metallized side of the film was buried in the lamination. The metallized film to low density polyethylene bond strengths were greater than 100 g/in with no aluminum transfer from the metallized film to the low density polyethylene film on bond-pulls.

This invention has been described with particular reference to preferred embodiments, but it will be understood that variations and modifications can be effected within the spirit and scope of the invention as described here and above and as defined in the appended claims.

What is claimed is:

1. A stretched multi-layer oxygen gas barrier film combination comprising in the following order:

(a) a base layer of polypropylene homopolymer or copolymer at least one surface thereof comprising a maleic acid anhydride modified polypropylene homopolymer or copolymer;

(b) a skin layer of an amorphous polyamide directly bonded on said at least one surface comprising a maleic acid anhydride modified polypropylene homopolymer or copolymer; and (c) a vacuum metallized layer on said polyamide skin layer.

2. The film combination of claim 1 wherein said at least one surface of (a) comprises:
  (1) said maleic anhydride modified polypropylene homopolymer or copolymer intermixed with said base layer polypropylene homopolymer or copolymer; or
  (2) a separately applied skin layer comprising said maleic anhydride modified polypropylene homopolymer or copolymer on said base layer.

3. The film combination of claim 1 wherein said base layer has a heat sealable layer on the surface opposite the surface carrying said polyamide skin layer.

4. The film combination of claim 3 wherein said heat sealable layer is a member selected from the group consisting of an ethylene-propylene random copolymer and an ethylene-propylene-butene-1 terpolymer.

5. The film combination of claim 1 wherein said metallized layer comprises aluminum.

6. The film combination of claim 3 wherein the metallized layer is laminated to another polyolefin film.

* * * * *